April 29, 1969 R. E. HALSTEAD ET AL 3,441,309
PARTITIONING APPARATUS FOR AUTOMOBILES
Filed Feb. 20, 1967

INVENTORS.
HAROLD A. HALSTEAD, JR.
ROBERT E. HALSTEAD
BY
ATTYS.

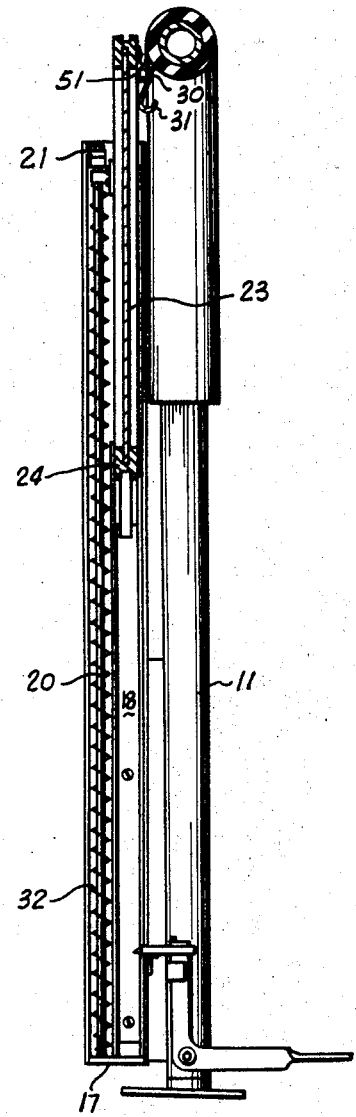
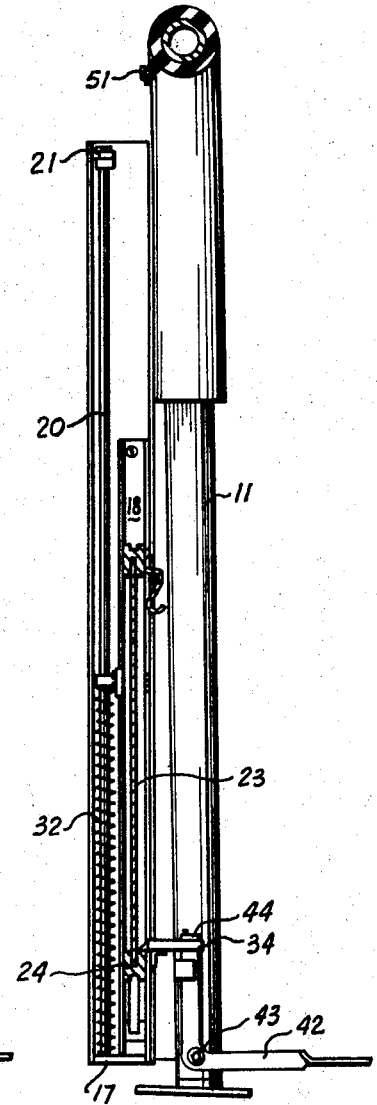

April 29, 1969  R. E. HALSTEAD ET AL  3,441,309
PARTITIONING APPARATUS FOR AUTOMOBILES
Filed Feb. 20, 1967  Sheet 3 of 3

INVENTORS.
HAROLD A. HALSTEAD, JR.
ROBERT E. HALSTEAD
BY
ATTYS.

United States Patent Office 3,441,309
Patented Apr. 29, 1969

3,441,309
PARTITIONING APPARATUS FOR AUTOMOBILES
Robert E. Halstead and Harold A. Halstead, Jr., Spokane, Wash., assignors to Novelty Carriage Works, Inc., a corporation of Washington
Filed Feb. 20, 1967, Ser. No. 617,276
Int. Cl. B60r 7/00; E05f 1/00
U.S. Cl. 296—24                    4 Claims

ABSTRACT OF THE DISCLOSURE

The disclosure describes an automobile partitioning device for separating the front compartment from the rear compartment. The device includes a roll bar 11 that is mounted to the interior of the auto adjacent the backrests of the front seats. A pair of facing side frames 13 and 14 are mounted to the bar 11. Each of the side frames has a track 18 vertically mounted thereto. A partition frame 24 is slidably mounted in the track 18 from a lower position to an upper position. Springs 32 urge the frame 24 upwardly. A locking mechanism 33 holds the frame 24 in the lower position. A locking mechanism 46 holds the partition frame 24 in the upper position.

Cross references to related applications

Invention disclosed and claimed in this specification is an improvement and alternative to the invention disclosed and claimed in Patent No. 3,015,515, entitled "Prisoner Confining Partition for Automobiles," granted to H. A. Halstead et al. on Jan. 2, 1962.

Background of the invention

This invention relates to partitioning devices for automobiles and more particularly for partitioning devices for separating the front compartment from the rear compartment adjacent the rear of the front seats of a passenger automobile.

It is often desirable to separate the interior of an automobile into a front compartment and a rear compartment in order to isolate persons residing therein. This is particularly desirable in police cars that are used to transport suspected or known criminals. Generally, the apprehended individuals are placed in the rear compartment on the rear seat and the policeman endeavors to drive the police car to the police station. In order to protect the policemen it is almost mandatory that the front compartment be enclosed and separated so that the prisoners in the rear compartment are unable to molest or injure the driver.

It is further desirable to have a partitioning device that is versatile in which the partition may be readily moved with a minimum of effort and attention from an inoperable position behind the front seat to an operable position to separate the compartments. During the period that the prisoners are apprehended and the time the prisoners are placed in the police car, the policeman's attention should be focused on the prisoners.

Many of the prior partitions require that the policeman used two hands to lift the partition from the inoperable position behind the front seat to the separating position to enclose the front compartment. This necessitates that two policemen be involved; one to watch the prisoners and the other to raise and lock the partition in the separating position.

One of the principal objects of this invention is to provide a partitioning device that, when actuated, automatically moves the partition from behind the front seat to the operable position between the front seats and the roof of the automobile and automatically locks the partition in place.

An additional object of this invention is to provide a partitioning device that may be actuated with a minimum of effort and attention.

A further object of this invention is to provide a partitioning device that has a locking means that automatically locks the partition in the operable position and that cannot be unlocked from the rear compartment.

An additional object of this invention is to provide a partitioning device that is efficient in operation, simple in construction, and economical to manufacture.

Summary of the invention

This invention is concerned with a partitioning device that includes a pair of side frames mounted to a roll bar. The frames have facing tracks mounted thereon. A partition is supported in a frame which is slidably mounted in the tracks for movement from a lower position immediately behind the front seats to a separating position between the roof and the front seats. The partitioning device has a locking mechanism for holding and releasing the partition in the lower position. A resilient structure, rendered effective upon the release of the partition, moves the partition to the separating position. More particularly the positioning device has a second locking mechanism mounted on the inside of the front compartment that is rendered effective by the upward movement of the partition frames to lock the partition in the separating position.

Brief description of the drawings

A preferred embodiment of this invention is illustrated in the accompanying drawings, in which:

FIG. 3 is a cross sectional view taken on line 3—3 in FIG. 1 with a partition shown in an upper or separating position;
FIG. 4 is a cross sectional view similar to FIG. 3 except the partition is shown in a lower position.

Description of the preferred embodiment

Figure 1:
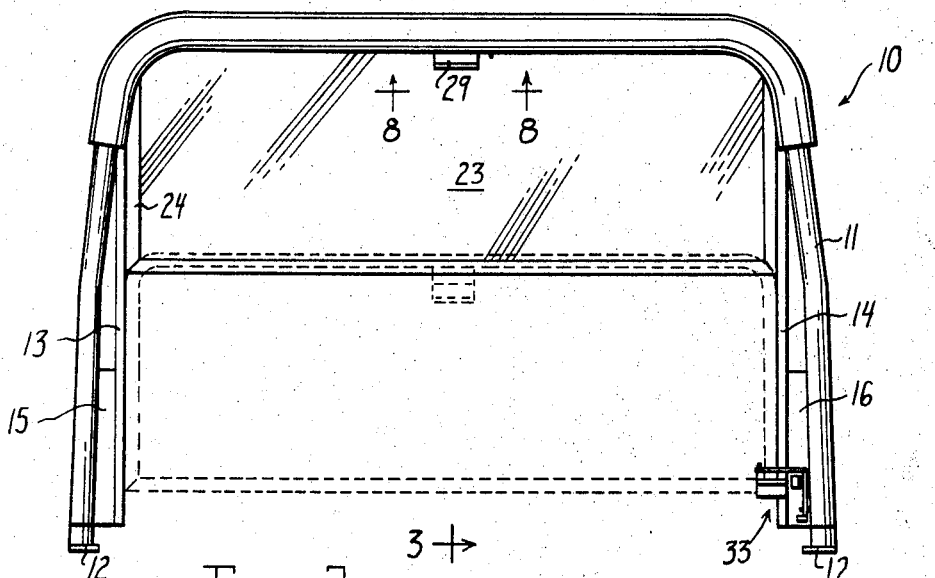
FIG. 1 is a front view of the partitioning device.
Figure 2:
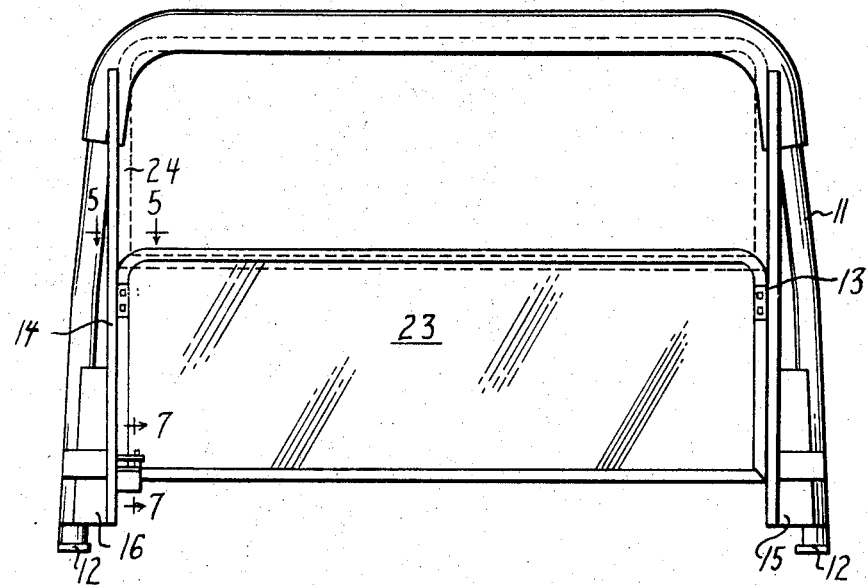
FIG. 2 is a rear view of the partitioning device.

Referring now in detail to the drawings, a partitioning device generally designated by number 10 is shown in a front view in FIG. 1. The partitioning device 10 includes a roll bar 11 that has the general contour of the inside of the automobile adjacent the backrests of the front seats. The U-shaped roll bar 11 is mounted to the automobile frame by plates 12. The roll bar 11 is generally positioned so that the roof segment of the roll bar extends over the backrest of the front seats. The upper segment of the roll bar has a resilient covering mounted thereon to protect the passengers. Opposing side frames or U-shaped channel irons 13 and 14 are positioned facing each other in a substantially vertical position immediately to the rear of the legs of the roll bar 11 by side braces 15 and 16 respectively. The bottoms of the side frames 13 and 14 are enclosed by base plates 17.

Each of the side frames has a track 18 mounted therein in a substantially vertical position. Each of the side frames also includes a guide rod 20 that extends from the base plate 17 to a support bracket 21 parallel to the tracks 18.

A vertical divider or partition 23 that is transparent and made of substantially unbreakable material such as glass or plastic is supported in a partition frame 24. On each side of the partition frame 24 a race 25 having a U-shaped cross section is attached thereto. The race 25 is slidably mounted in the track 18 by ball bearings 26. The ball bearings are separated and guided by ball guides 27 that are interposed between the race 25 and the tracks 18. Bearing sleeves 28, extending from each side of the partition frame 24, are slidably mounted on the guide rods 20.

The partition frame 24, including the partition 23, may be moved in the tracks 24 from a lower position that is immediately behind the backrests of the front seats to an upward or separating position that is between the top of the backrests of the front seats and the roof of the automobile.

A handle 29 is centrally mounted to the upper horizontal member of the partition frame 24 facing the front compartment. The handle 29 has an L-shaped lock receiving contour 30 extending from the partition frame that flows into a curved contour 31. The curved contour 31 is capable of being gripped by the human hand.

Resilient means engage the partition frame 24 and move the frame from the lower position to the separating position. Specifically the resilient means includes springs 32 that are located about the guide rods 20 and extend from the base plates 17 to the bearing sleeves 28.

Figure 6:
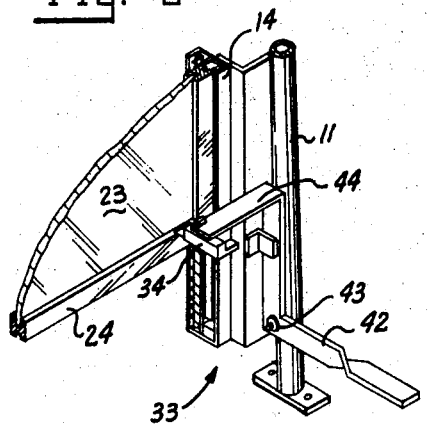
FIG. 6 is a fragmentary perspective view showing a locking mechanism for holding the partition in the lower position.
Figure 8:
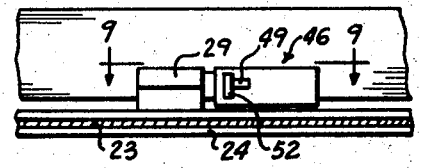
FIG. 8 is a fragmentary bottom view taken on line 8—8 in FIG. 1 showing a locking mechanism for holding the partition in the upper position.
Figure 5:
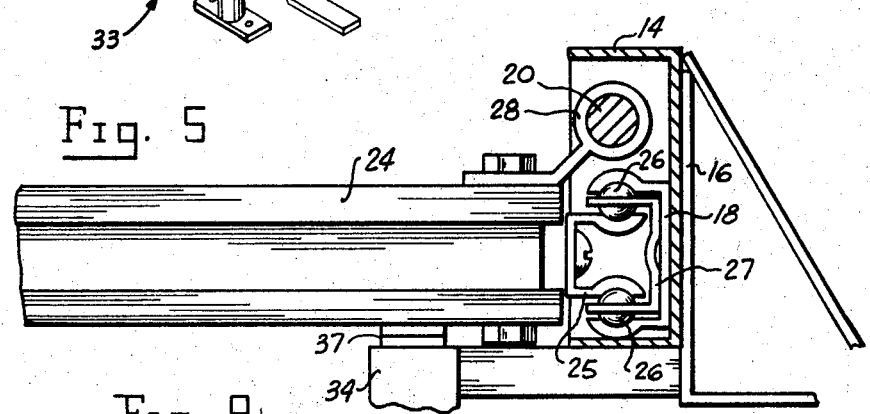
FIG. 5 is a cross sectional view taken on line 5—5 in FIG. 2.
Figure 9:
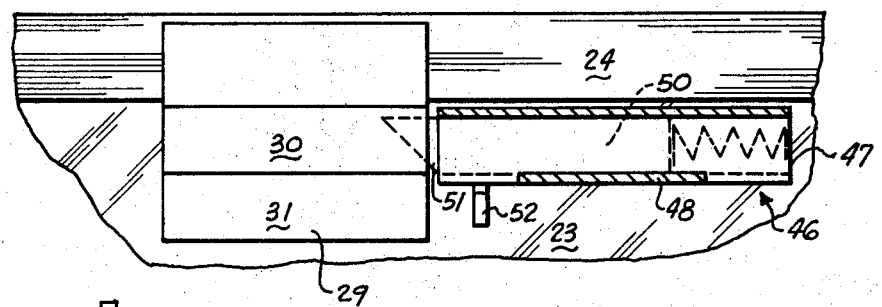
FIG. 9 is an enlarged fragmentary cross sectional view taken on line 9—9 in FIG. 8.
Figure 7:
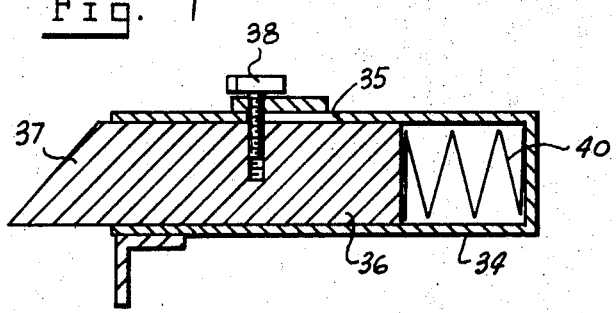
FIG. 7 is an enlarged cross sectional view taken on line 7—7 in FIG. 2.

The partitioning device 10 also includes a locking mechanism 33 that is rendered effective to hold the partition 23 from moving upwardly when the partition frame 24 is in the lower position. The locking mechanism 33, as may be particularly seen in FIG. 6, includes a lock housing 34 that is mounted to the side frame 14 transverse to the moment of the partition 23. The lock housing has a longitudinal slot 35 formed in the upper wall thereof. A lock bolt 36 is slidably mounted in the housing 34 with a beveled end 37 projecting into the path of the partition frame 24. The beveled surface of the end 37 faces upwardly so that when the partition frame 24 moves downwardly and engages the end 37 the bolt 36 will move transversely out of the path of the partition frame 24. A projection 38 extends from the bolt 36 through the slot 35. A spring 40 is mounted between the bolt 36 and the housing 34 to bias the bolt 36 forward to move the beveled end 37 into the path of the partition frame 24.

The locking mechanism 33 also includes a releasing means that requires little effort and attention to operate to release the partition frame 24. The releasing means includes a foot lever 42 that is pivotally mounted on a shaft 43 that is affixed to one leg of the roll bar 11. The foot lever 42 has an arm 44 that projects inward from the roll bar 11 to connect with the projection 38.

The partitioning device 10 further includes a second locking means 46 that is rendered effective to hold the partition 23 from moving downwardly when the partition frame 24 is in the upper position. The locking mechanism 46 includes a lock housing 47 that is rigidly attached to the roof segment of the roll bar 11 by a brace 48. The lock housing 47 is mounted parallel to the partition frame 24 and slightly offset from the path of the partition handle 29. The lock housing 47 has a longitudinal slot 49 formed therein. A lock bolt 50 having a beveled end 51 is slidably mounted in the lock housing 47 with the beveled end 51 projecting into the path of the handle 29. The beveled face of the bolt 50 faces downwardly so that when the partition frame 24 moves upwardly the handle 29 engages the beveled end 51 to move the bolt inwardly against the spring. A projection 52 is mounted to the bolt 50 and extends through the slot 49.

To actuate the partition device 10 the operator need only to place his foot on the lever 42 and apply pressure. The lever 42 pivots about shaft 43 and moves the bolt 36 against the spring 40 to move the beveled end 37 from the path of the partition frame 24 to release the partition frame 24. Upon the release of the partition frame 24 the springs 32 urge and move the partition frame 24 upwardly in the tracks 18 to the elevated or separating position. As the partition frame approaches its upper position the handle 29 engages the beveled end 51 of the locking mechanism 46 to move the beveled end 51 from the path of the handle 29. After the L-shaped contour 30 of the handle 29 moves past the beveled end 51 the bolt 50 moves forward with the beveled end 51 projecting under and into the path of the handle 29 to hold the partition frame 24 in the separating position.

To release the partition frame 24 from the upper position the operator moves the projection 52 to move the beveled end 51 from the handle 29. The operator then grips the handle 29 and moves the partition frame 24 downwardly against the spring 32.

As the partition frame 24 moves downwardly the partition frame engages the beveled end 37 of the locking machanism 33 and moves the beveled end 37 from the path of the partition frame 24. When the lower horizontal member of partition frame 24 moves past the beveled end 37 the beveled and 37 moves forward into the path of the partition frame 24 to hold the partition frame in the lower position. It should be noted that both of the locking mechanisms 33 and 46 are located on the inside of the front compartment so that persons in the rear compartment will be unable to move the partition frame 24.

It is understood that the above described embodiment is simply illustrative of the application of the principles of this invention. Numerous other arrangements may be readily devised by those skilled in the art which will embody the principles of this invention and fall within the spirit and scope thereof. Therefore, only the following claims are intended to define and limit my invention.

What we claim is:

1. In combination with an automobile having a front compartment with front seats and a rear compartment therein, an automobile partitioning device mounted within the automobile behind the front seats for separating the front compartment from the rear compartment, said automobile positioning
    (a) an inverted U-shaped roll bar attached to the automobile;
    (b) a pair of side frames attached to the roll bar, each of said side frames having an upright track and a guide rod adjacent to and parallel with the track;
    (c) an unbreakable transparent partition for separating the front compartment from the rear compartment;
    (d) a partition frame supporting said partition and movably mounted in said tracks for movement from a lower position immediately behind the front seats to a separating position above the front seats, said partition frame having bearing sleeves extending from the sides thereof slidably mounted on the guide rods;
    (e) compression springs surrounding the guide rods and engaging the bearing sleeves for biasing the partition frame to the separating position;
    (f) a first locking means mounted on one of the side frames and projecting into the path of the partition frame for holding the partition frame in the lower position against the compression springs and for releasing the partition frame to render the compression springs effective to move the partition frame from the lower position to the separating position; and
    (g) a second locking means mounted on the roll bar within the front compartment and projecting into the path of the partition frame for locking the partition frame from downward movement when the partition frame reaches the separating position.

2. The combination in accordance with claim 1 wherein the first locking means is mounted on one of the side frames inside the front compartment and includes:
   (a) a movable locking bolt having an upwardly facing beveled end for projecting into the path of the partition frame;
   (b) a resilient means engaging the bolt from moving the beveled end into the path of the partition frame to hold the partition frame in the lower position; and
   (c) lever means connected to the bolt for moving the bolt against the resilient means to move the beveled end from the path of the partition frame to release the partition frame.

3. The combination in accordance with claim 1 wherein:
   (a) the partition frame has a grip handle extending into the front compartment; and
   (b) the second latching means includes
      (1) a movable locking bolt having a downwardly facing beveled end for projecting into the path of a grip handle and
      (2) a resilient means engaging the bolt for moving the beveled end into the path of the handle to hold the partition frame in the separating position.

4. The combination in accordance with claim 3 wherein the grip handle is mounted to the partition frame intermediate the side brackets and the second latching means is mounted to the central portion of the roll bar.

References Cited
UNITED STATES PATENTS

| | | | |
|---|---|---|---|
| 3,015,515 | 1/1962 | Halstead | 296—24 |
| 2,865,670 | 12/1958 | Dunn | 296—24 |
| 2,076,938 | 4/1937 | Chandler | 49—379 |

PHILIP GOODMAN, *Primary Examiner.*

U.S. Cl. X.R.

49—379